(12) United States Patent
Meth et al.

(10) Patent No.: US 6,256,751 B1
(45) Date of Patent: Jul. 3, 2001

(54) RESTORING CHECKPOINTED PROCESSES WITHOUT RESTORING ATTRIBUTES OF EXTERNAL DATA REFERENCED BY THE PROCESSES

(75) Inventors: Kalman Zvi Meth, Netanya; Adnan M. Agbaria, Musmus, both of (IL); Jose Moreira; Vijay Naik, both of Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/182,725

(22) Filed: Oct. 29, 1998

(51) Int. Cl.$^7$ ........................................... G06F 11/14
(52) U.S. Cl. .............................. 714/15; 712/228; 707/202
(58) Field of Search ................................ 714/15, 13, 16, 714/17, 38, 2; 707/202; 712/228

(56) References Cited

U.S. PATENT DOCUMENTS

| | | | |
|---|---|---|---|
| 4,703,481 | 10/1987 | Fremont | 371/12 |
| 5,301,309 | 4/1994 | Sugano | 395/575 |
| 5,327,551 | 7/1994 | Kaneko | 395/575 |
| 5,551,043 | 8/1996 | Crump et al. | 395/750 |
| 5,608,704 | 3/1997 | Kim | 369/56 |
| 5,630,047 | 5/1997 | Wang | 395/182.13 |
| 5,644,742 | 7/1997 | Shen et al. | 395/591 |
| 5,659,721 | 8/1997 | Shen et al. | 395/569 |
| 5,659,762 | 8/1997 | Sawada et al. | 395/750.05 |
| 5,712,971 | * 1/1998 | Stanfill et al. | |
| 5,907,673 | * 5/1999 | Hirayama et al. | |
| 5,958,070 | * 9/1999 | Stiffler | |

OTHER PUBLICATIONS

Checkpoint and Migration of Unix Processes in the Condor Distributed Processing System, Todd Tannenbaum, Michael Litskow, Dr. Dobbs Journal, 227:40–48, Feb. 1995.

Supporting Checkpointing and Process Migration Outside the Unix Kernel, M. Litskow, M. Solomon, Proceedings of Usenix Winter 1992 Conference, Jan. 1992.

Libckpt: Transparent Checkpointing Under Unix, James S. Plank, Micah Beck, Gerry Kingsley, Kai Li, Usenix Winter 1995 Technical Conference, Jan. 1995.

An Overview of Checkpointing in Uniprocessor and Distributed Systems, Focusing on Implementation and Performance, James S. Plank, Technical Report UT–CS–97–372, University of Tennessee, Jul. 1997.

Efficient Checkpointing on MIMD Architectures, James Steven Plank, PhD Dissertation, Princeton University, Jun. 1993.

Checkpointing Distributed Shared Memory, Luis M. Silva, Joao Gabriel Silva, The Journal of Supercomputing, 11:137–158 (1997).

A Checkpointing Strategy for Scalable Recovery on Distributed Parallel Systems, Vijay K. Naik, Samuel P. Midkiff, Jose E. Moreira, IBM Research Report, Jun. 23, 1997.

* cited by examiner

Primary Examiner—Gopal C. Ray
(74) Attorney, Agent, or Firm—Floyd A. Gonzalez, Esq.; Blanche E. Schiller, Esq.; Heslin & Rothenberg, P.C.

(57) ABSTRACT

A checkpoint of a process is taken in order to provide a consistent state of the process in the event the process is to be restarted. When the process is restarted, the process is placed in the state it was in when the checkpoint was taken. However, there are times when certain information has changed since the last checkpoint and it should not be restored. For example, if a process is restarted on a computing unit different from the one in which the checkpoint is taken, then various attributes associated with external data referenced by the process (e.g., an address to an external function/variable) might be different than at the time of the checkpoint. Similarly, even on the same computing unit, if the functions and/or variables are reloaded, the attributes may be different. Since these new attribute values are needed for the restarted process, they should not be restored. In order to prevent restoration of the attributes, only part of the Data Section is restored. The portion of the Data Section including the attributes remains intact.

19 Claims, 7 Drawing Sheets

RESTORING CHECKPOINTED PROCESSES WITHOUT RESTORING ATTRIBUTES OF EXTERNAL DATA REFERENCED BY THE PROCESSES

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"A METHOD OF PERFORMING CHECKPOINT/ RESTART OF A PARALLEL PROGRAM," by Meth, et al., Ser. No. 09/181,985,;

"A SYSTEM OF PERFORMING CHECKPOINT/ RESTART OF A PARALLEL PROGRAM," by Meth et al., Ser. No. 09/181,981;

"PROGRAM PRODUCTS FOR PERFORMING CHECKPOINT/ RESTART OF A PARALLEL PROGRAM," by Meth et al., Ser. No. 09/182,555,;

"RESTORING CHECKPOINTED PROCESSES INCLUDING ADJUSTING ENVIRONMENT VARIABLES OF THE PROCESSES," by Meth et al., Ser. No. 09/182,357,; and "CAPTURING AND IDENTIFYING A COMPLETE AND CONSISTENT SET OF CHECKPOINT FILES," by Meth et al., Ser. No. 09/182,175,.

TECHNICAL FIELD

This invention relates, in general, to restoring checkpointed processes and, in particular, to leaving attributes of external data referenced by the checkpointed processes unrestored when the checkpointed processes are restored.

BACKGROUND ART

A requirement of any robust computing environment is to be able to recover from errors, such as device hardware errors (e.g., mechanical or electrical errors) or recording media errors. In order to recover from some device or media errors, it is necessary to restart a process, either from the beginning or from some other point within the process.

To facilitate recovery of a process, especially a long running process, intermediate results of the process are taken at particular intervals. This is referred to as checkpointing the process. Checkpointing enables the process to be restarted from the last checkpoint, rather than from the beginning of the process.

When a process is restarted, it is restored to the state it was in when the checkpoint was taken. Thus, any and all changes subsequent to the last checkpoint are undone. This includes any changes that have been made to attributes of external data, such as external functions and/or external variables, referenced by the process. Once the process is restored to its former state, it continues to execute from that point.

Based on the foregoing, a need exists for a restore capability that does not require that all information be restored to the point at which the checkpoint was taken. That is, a need exists for a capability that allows selected information to remain unrestored. In particular, a need exists for a restore capability that enables attributes of external data to remain unrestored, even though other components of the process are being restored.

SUMMARY OF THE INVENTION

The shortcomings of the prior art are overcome and additional advantages are provided through the provision of a method of restoring checkpointed processes that have references to external data. The method includes, for instance, restarting a process on a computing unit from a checkpoint taken of the process, wherein the process includes a reference to an external datum. Further, the method includes restoring the process using information obtained from the checkpoint. The restoring leaves one or more attributes of the external datum unrestored.

In one example, the external datum includes one of an external function and an external variable.

Further, the process is restarted on a computing unit, which is different from the computing unit used to take the checkpoint. In another example, the process is restarted on the same computing unit used to take the checkpoint.

In yet another embodiment of the present invention, the one or more attributes are located in a data section of the process, and the restoring includes restoring the data section except for the one or more attributes stored therein.

In one example, the restoring of the data section includes, for instance, obtaining a beginning address of a table of contents of the data section, wherein the table of contents includes the one or more attributes; obtaining an ending address of the table of contents; restoring information located in the data section before the beginning address of the table of contents, if any; and restoring information located in the data section after the ending address of the table of contents, if any.

In another aspect of the present invention, a system of restoring checkpointed processes that have references to external data is provided. The system includes, for instance, means for restarting a process on a computing unit from a checkpoint taken of the process, wherein the process includes a reference to an external datum; and means for restoring the process using information obtained from the checkpoint, wherein the means for restoring leaves one or more attributes of the external datum unrestored.

In yet a further aspect of the present invention, a system of restoring checkpointed processes that have references to external data is provided. The system includes a computing unit adapted to restart a process from a checkpoint taken of the process, wherein the process includes a reference to an external datum. The computing unit is further adapted to restore the process using information obtained from the checkpoint, wherein one or more attributes of the external datum are left unrestored.

In a further aspect of the present invention, an article of manufacture, including at least one computer usable medium having computer readable program code means embodied therein for causing the restoring of checkpointed processes that have references to external data, is provided. The computer readable program code means in the article of manufacture includes, for instance, computer readable program code means for causing a computer to restart a process on a computing unit from a checkpoint taken of the process, wherein the process includes a reference to an external datum; and computer readable program code means for causing a computer to restore the process using information obtained from the checkpoint, wherein the computer readable program code means for causing a computer to restore leaves one or more attributes of the external datum unrestored.

The capabilities of the present invention advantageously enable attributes of external data to remain unrestored, even though a process is being restarted from a checkpoint. This allows a process to be restored and to still reflect some aspects of the current operating environment. Thus, greater flexibility is provided for the restarted process. For example, a process can be restarted on a different computing unit than the one used to take the checkpoint, and the new computing unit is reflected in the process, rather than the old computing unit.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, restore capabilities are provided that enable selected information, such as attributes of external data (e.g., external functions/variables) referenced by the process, to remain unrestored, when a checkpointed process is being restored. For example, after a process is restarted, it is restored to the state it was in when the checkpoint was taken. However, in accordance with the invention, attributes of external data are not restored, so that the current operating environment is reflected in the process, rather than the operating environment from when the checkpoint was taken. This is advantageous when, for instance, the process is restarted on a different computing unit than the one used when the checkpoint was taken (i.e., the process is migrated).

Figure 1A:
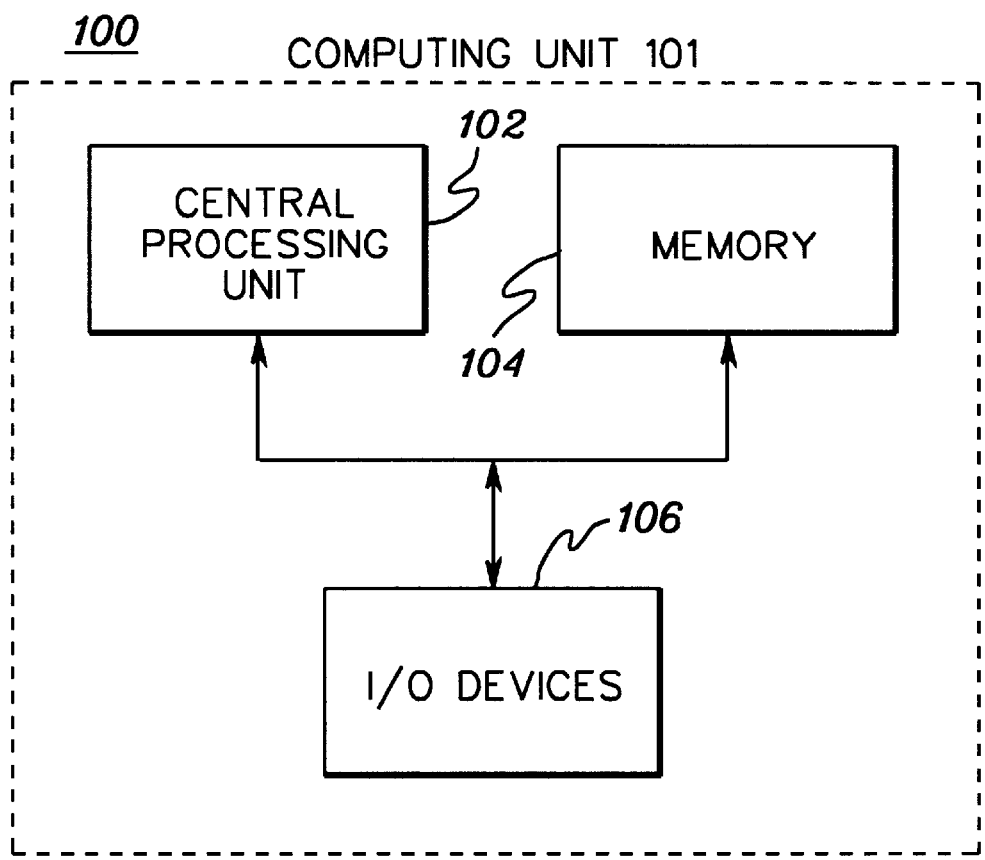
FIGS. 1A and 1B depict examples of computing environments incorporating and using the restore capabilities of the present invention.

One example of a computing environment incorporating and using the restore capabilities of the present invention is depicted in FIG. 1a. Computing environment 100 includes, for instance, a computing unit 101 having at least one central processing unit 102, a main memory 104 and one or more input/output devices 106, each of which is described below.

As is known, central processing unit 102 is the controlling center of computing unit 101 and provides the sequencing and processing facilities for instruction execution, interruption action, timing functions, initial program loading and other machine related functions.

The central processing unit executes at least one operating system, which as known, is used to control the operation of the computing unit by controlling the execution of other programs, controlling communication with peripheral devices and controlling use of the computer resources.

Central processing unit 102 is coupled to main memory 104, which is directly addressable and provides for high speed processing of data by the central processing unit. Main memory 104 may be either physically integrated with the CPU or constructed in standalone units.

Main memory 104 and central processing unit 102 are also coupled to one or more input/output devices 106. These devices include, for instance, keyboards, communications controllers, teleprocessing devices, printers, magnetic storage media (e.g., tape, disks), direct access storage devices, sensor-based equipment, and other storage media. Data is transferred from main memory 104 to input/output devices 106, and from the input/output devices back to main memory.

In one example, computing environment 100 is a single system environment, which includes an RS/6000 computer system running an AIX operating system. (RS/6000 and AIX are offered by International Business Machines Corporation). In another example, computing environment 100 includes a UNIX workstation running a UNIX-based operating system. Other variations are also possible and are considered a part of the claimed invention.

Figure 1B:
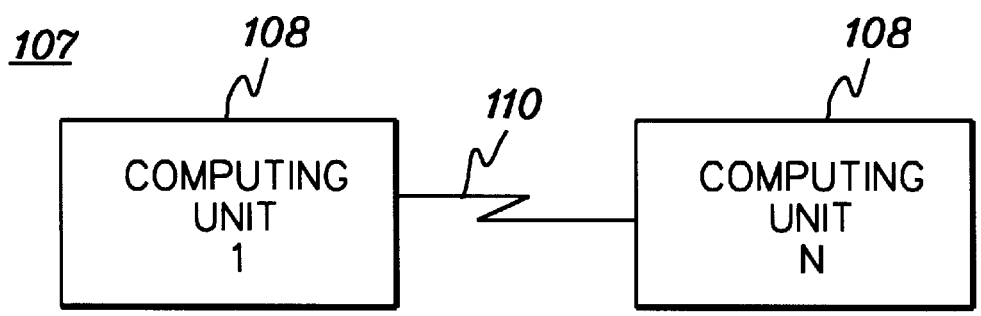

Another embodiment of a computing environment incorporating and using the restore capabilities of the present invention is depicted in FIG. 1b. In one example, a computing environment 107 includes a plurality of computing units 108 coupled to one another via a connection 110. In one example, each unit is an RS/6000 computing node running AIX, and the units are coupled together via a token ring or a local area network (LAN). Each unit includes, for example, a central processing unit, memory and one or more input/output devices.

In another embodiment, each unit is a UNIX workstation running a UNIX-based operating system, and the units are coupled to one another via a TCP/IP connection.

In yet a further embodiment, the environment includes a large parallel system with a plurality of units (e.g., 512 nodes) coupled to one another via a network connection, such as a switch. The invention is not limited to a particular number of units coupled together.

The above embodiments are only examples, however. The capabilities of the present invention can be incorporated and used with any type of computing environments or computing units (e.g., nodes, computers, processors, systems, machines, and/or workstations), without departing from the spirit of the present invention.

A computing unit of the present invention is capable of executing both serial processes and parallel programs. A parallel program includes one or more processes (or tasks) that are executed independently.

Figure 2:
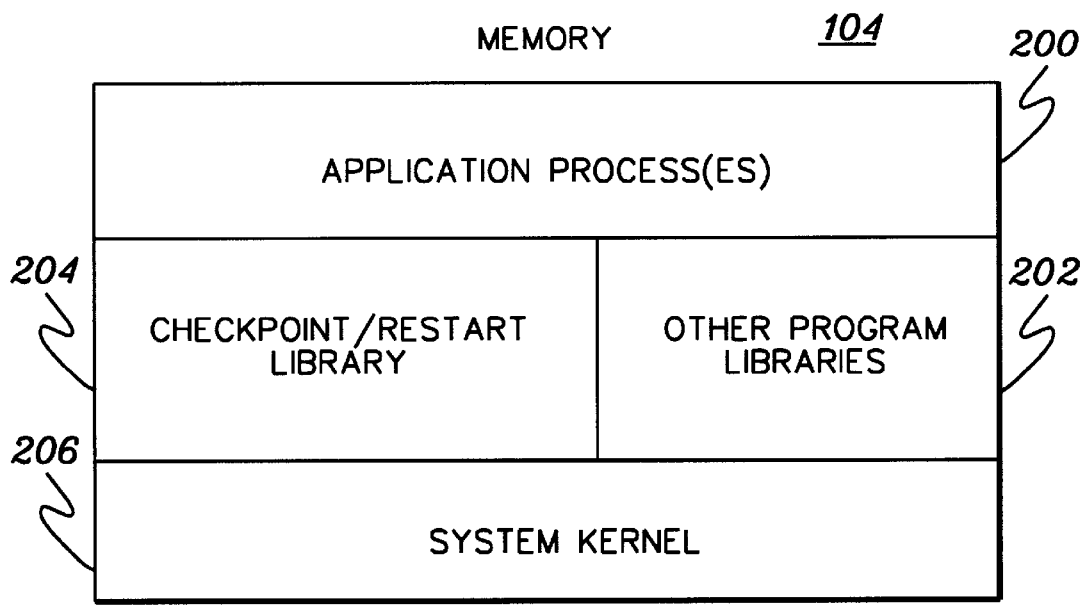
FIG. 2 depicts one example of various components of the memory depicted in FIG. 1A, in accordance with the principles of the present invention.

Each process (e.g., a serial process, a process of a parallel program, or any other type of process) is loaded in the memory of the computing unit that is to execute the process. This is depicted in FIG. 2. As one example, memory 104 includes one or more application processes 200. Each process makes library calls to various program libraries 202, also loaded within the memory. One program library that is called, in accordance with the principles of the present invention, is a checkpoint/restart library 204. Checkpoint/restart library 204 is called by each process that wishes to use the checkpoint/ restart capabilities of the present invention. In addition to the above, memory 104 includes a system kernel 206, which provides various system services to the application processes and the libraries.

Figure 3:
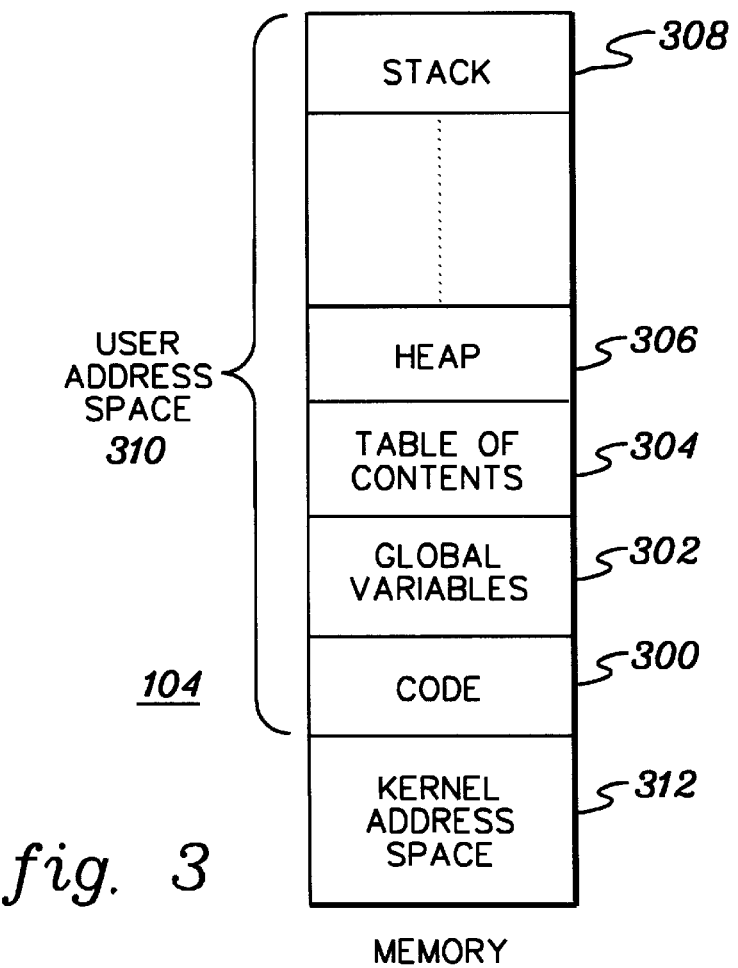
FIG. 3 depicts one embodiment of a memory layout of a process, in accordance with the principles of the present invention.

Memory 104 is further described with reference to FIG. 3, which depicts one embodiment of the memory layout for an application process. In particular, for each process, memory 104 includes programming code 300, global variables 302 used by the process, a table of contents 304 appended to global variables 302, a heap 306 (for dynamic memory allocation while the program is running), and a stack 308. The global variables, the table of contents, and the heap are referred to as the "Data Section" of the process, which is distinct from the stack of the process. Each process running in the computing unit has, in addition to its code, a separate portion of memory to store its Data Section and stack. This section is referred to as a user address space 310. In addition to the user address space, the memory includes a kernel address space 312 for running the system kernel.

Each process running in the computing unit also has a separate copy of the registers, including a stack pointer and a program counter.

Table of contents 304 contains information relating to references to functions and variables in other process modules (such as shared libraries and system calls). For example, the table of contents includes pointers to externally defined functions, including (for AIX) system calls. In order to call an external function, a loader plugs the address of the external function in the table of contents and then the process begins executing the code specified at the address in the table of contents. The same mechanism is also used to invoke a system call, which is a special kind of function that usually resides in the kernel of the operating system.

Figure 4:
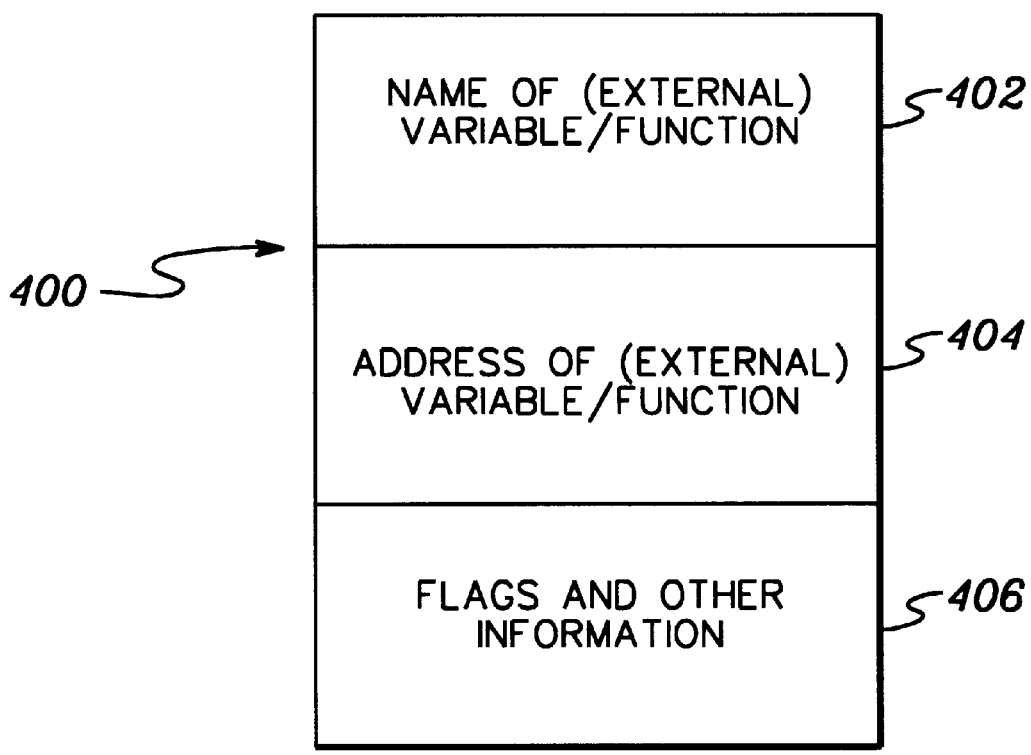
FIG. 4 depicts one example of information located in an entry of a table of contents, in accordance with the principles of the present invention.

The table of contents is a collection of entries, where each entry contains the attributes of a single global or external variable/function that is used by the process. One example of a table of contents entry 400 is depicted in FIG. 4. Each entry includes, for instance, a name of an external variable/function 402, an address 404 of where that variable/function resides in memory, and any additional attributes 406 of the variable/function.

Figure 5:
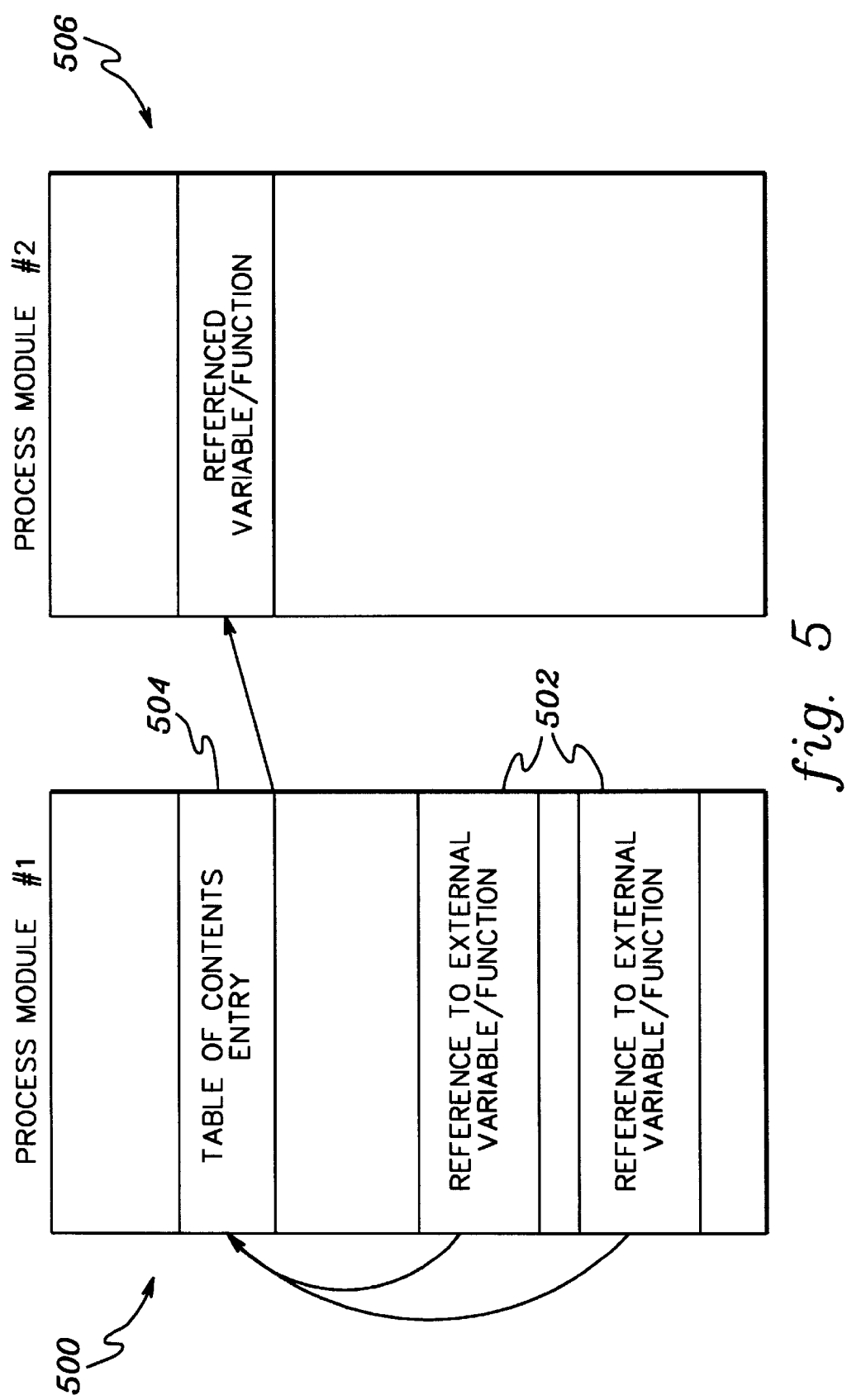
FIG. 5 depicts one embodiment of a process referencing an external variable or function, in accordance with the principles of the present invention.

If a process includes several distinct modules (for instance, if it uses a shared library or system calls), then references from the code in one module to variables/functions in another module go through the table of contents. For example, a process module 500 (FIG. 5) includes one or more references 502 to the same external variable/function. All of these references point to the same table of contents entry 504. A loader fills in the address information in the table of contents entry for this external reference at load time, so that when the process is running, the table of contents entry points to the proper address for the variable/function in another module 506.

Specifically, at compile time, references to external data (e.g., variables/functions) cannot be resolved, since the compiler does not know where to find the external data. The compiler transforms the code that references the external data to point to the table of contents entry for that external data, and it marks that table of contents entry as an unresolved external reference. The process is then linked using a linker/binder, a mechanism in which all of the modules used by the process are declared, and it is ensured that all external references can be resolved. When the process is loaded (made ready to run), the loader finds all of the modules that are needed to run the process, and loads them into memory. The loader then fixes the table of contents entries for all of the unresolved external references in each module by suppling the addresses of the external data that are now available. This process of fixing the external data addresses in the table of contents entries is part of what is called "relocation" of the process.

Additional information on the loader and relocation is described in detail in "AIX Version 4 Files Reference," Publication No. SC23-4168 (October 1997); and "AIX Version 4.3 Assembler Language Reference," available on the AIX Version 4.3 Extended Documentation CD, which are hereby incorporated herein by reference in their entirety. Additional information relating to the linker/binder is described in "AIX Version 4.3 Commands Reference," Publication No. SBOF-1877 (Volumes 1–6) (October 1997), which is hereby incorporated herein by reference in its entirety.

Figure 6:
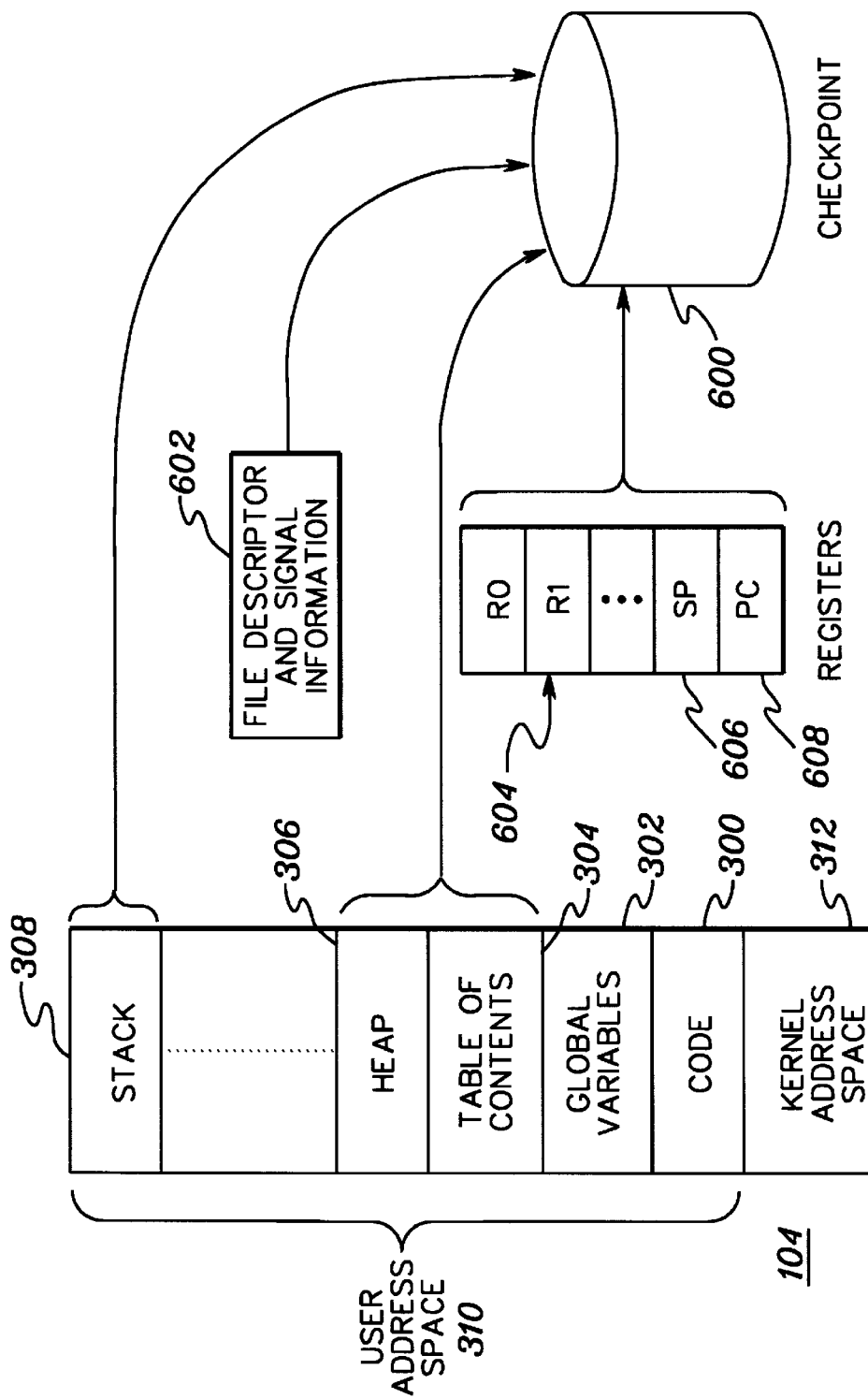
FIG. 6 depicts one embodiment of the information saved during the taking of a checkpoint of a process, in accordance with the principles of the present invention.

As a process executes, checkpoints are taken, at particular intervals, in order to provide intermediate points at which a process may be restarted. When a user-level checkpoint is taken, certain information is saved, as depicted in FIG. 6. For example, the Data Section of a process, including global variables 302, table of contents 304, and heap 306, are saved to a checkpoint file 600, which is stored in local or global storage. Additionally, stack 308 and various file descriptor and signal information 602 are saved to the checkpoint file. Further, one or more registers 604, including a stack pointer 606 and a program counter 608, are saved in the checkpoint file. Code 300 need not be saved, since the original code remains unchanged when the program runs, and the original copy of the code is used during restart.

Embodiments for taking a checkpoint are described in "Checkpoint and Migration of Unix Processes in the Condor Distributed Processing System", by Todd Tannenbaum, Michael Litzkow, Dr. Dobbs Journal, 227:40–48, February 1995; and in "Checkpoint and Migration of UNIX Processes in the Condor Distributed Processing System", by Michael Litzkow, Todd Tannenbaum, Jim Basney, and Miron Livny, University of Wisconsin-Madison Computer Science Technical Report #1346, April 1977, each of which is hereby incorporated herein by reference in its entirety. Another embodiment for taking a checkpoint is described in detail in co-pending, commonly assigned, U.S. Patent Application entitled "A Method of Performing Checkpoint/Restart of a Parallel Program," by Meth et al., Ser. No. 09/181,985, which is hereby incorporated herein by reference in its entirety.

The data saved during the checkpointing of the process is used to restart the process, should a restart be necessary. When a restarted process is loaded into memory, the loader patches the entries in the process' table of contents to point to the correct addresses of the functions on the machine at restart time. These may be different from the values of the function/variable addresses at checkpoint time. This is particularly the case when the process is migrated to a different machine. It is possible that the addresses of the function and/or system calls on the second machine (after migration) differ from the addresses of the function and/or system calls on the original machine (before checkpoint). It is even possible (under AIX and other operating systems) to have different addresses for the same function and/or system calls on the same machine, if, for instance, the system was rebooted and the modules that contain the function and/or system calls were loaded in a different order. In accordance with the principles of the present invention, upon restart, the new values of the table of content entries are to be preserved, so that the pointers to the correct function/variable addresses are kept in existence at restart time.

Figure 7:
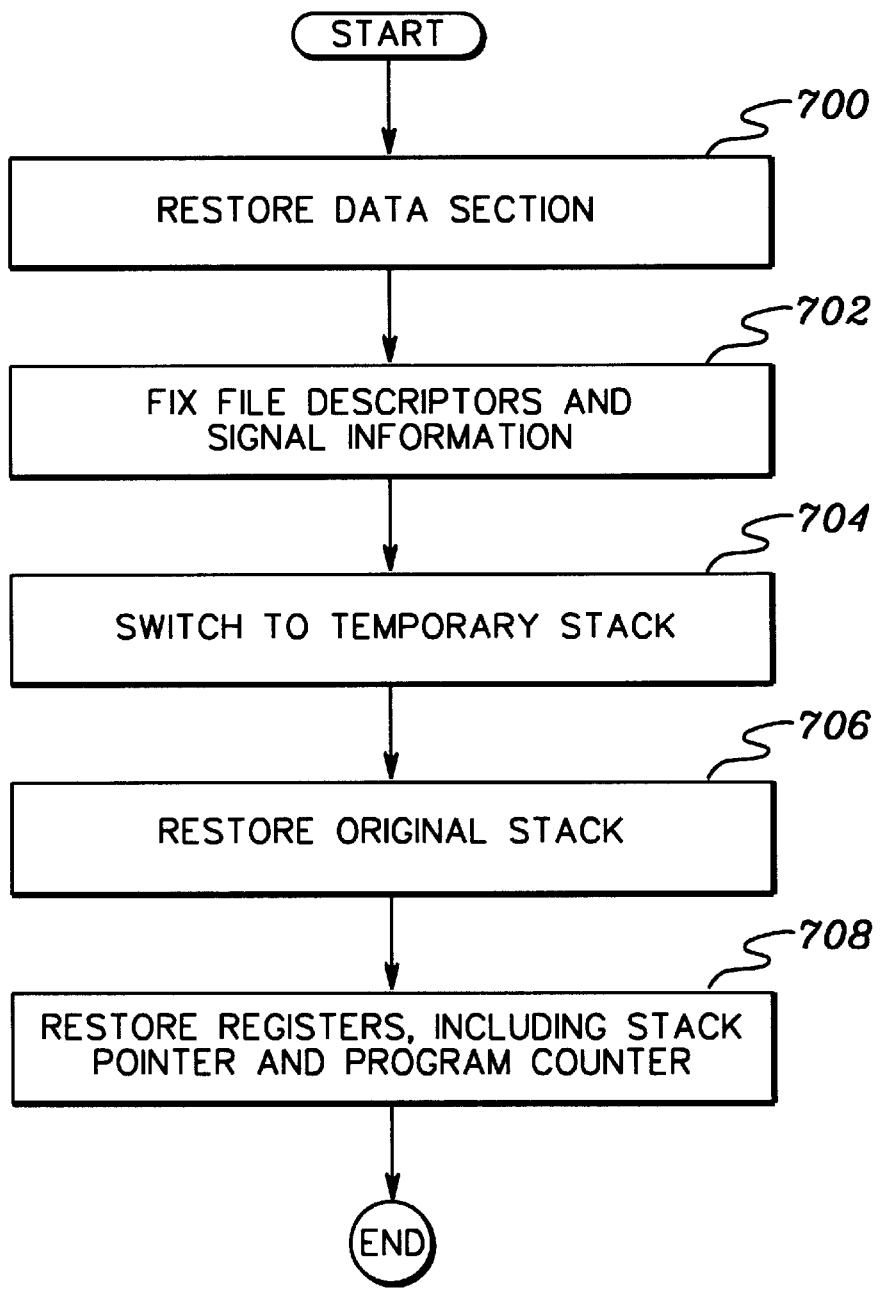
FIG. 7 depicts one embodiment of the logic associated with restarting a process using the checkpoint data previously taken, in accordance with the principles of the present invention.

One embodiment of the logic used to restart a process is described in detail with reference to FIG. 7. Initially, the Data Section is restored using the information stored in the checkpoint file, STEP 700. In particular, portions of the Data Section of the restarted process are replaced by the corresponding portions saved in the checkpoint file, while other portions are not replaced. This is further described with reference to FIG. 8.

Subsequently, the file descriptors and signal information are fixed to reflect the checkpoint, STEP 702. Embodiments of fixing the file descriptors and signal information are described in "Checkpoint and Migration of Unix Processes in the Condor Distributed Processing System", by Todd Tannenbaum, Michael Litzkow, Dr. Dobbs Journal, 227:40–48, February 1995; and in "Checkpoint and Migration of UNIX Processes in the Condor Distributed Processing System", by Michael Litzkow, Todd Tannenbaum, Jim Basney, and Miron Livny, University of Wisconsin-Madison Computer Science Technical Report #1346, April 1977, each of which is hereby incorporated herein by reference in its entirety.

In addition to the above, restoration of the stack begins. When performing user-level checkpoint/restart, there is difficulty in restoring the stack. This is because the process is running on its stack, while it is performing its restart operation. Since the process is using the stack during restart, it cannot safely overwrite its stack with the saved checkpoint stack. Thus, a temporary stack is used. The temporary stack is allocated (up-front) in the Data Section of the process. The process switches to the temporary stack by using, for instance, a setjmp/longjmp mechanism and by manipulating the stack pointer entry provided by the setjmp call, STEP 704. This is also further described in detail in "Checkpoint and Migration of Unix Processes in the Condor Distributed Processing System", by Todd Tannenbaum, Michael Litzkow, Dr. Dobbs Journal, 227:40–48, February 1995; and in "Checkpoint and Migration of UNIX Processes in the Condor Distributed Processing System", by Michael Litzkow, Todd Tannenbaum, Jim Basney, and Miron Livny, University of Wisconsin-Madison Computer Science Technical Report #1346, April 1977, each of which is hereby incorporated herein by reference in its entirety.

While running on the temporary stack, the original stack is restored, STEP 706. In particular, the stack contents are copied from the corresponding checkpoint file to memory.

Thereafter, the registers, including the stack pointer and program counter, are restored using the checkpointed data, STEP 708. In one example, this is performed using the UNIX longjmp command. At this point, the process is running on the original restored stack from the point where the checkpoint was taken.

As described above, one aspect of the restart sequence is restoring the Data Section. The Data Section includes the global variables, the table of contents and the heap of the process. In accordance with the principles of the present invention, the global variables and the heap are to be restored when the process is restarted, but the table of contents is not to be restored, since the table of contents already contains correct function/variable addresses for the restarted process. Thus, only selected portions of the Data Section are restored. The outdated information in the table of contents stored in the checkpoint file is skipped over.

Figure 8:
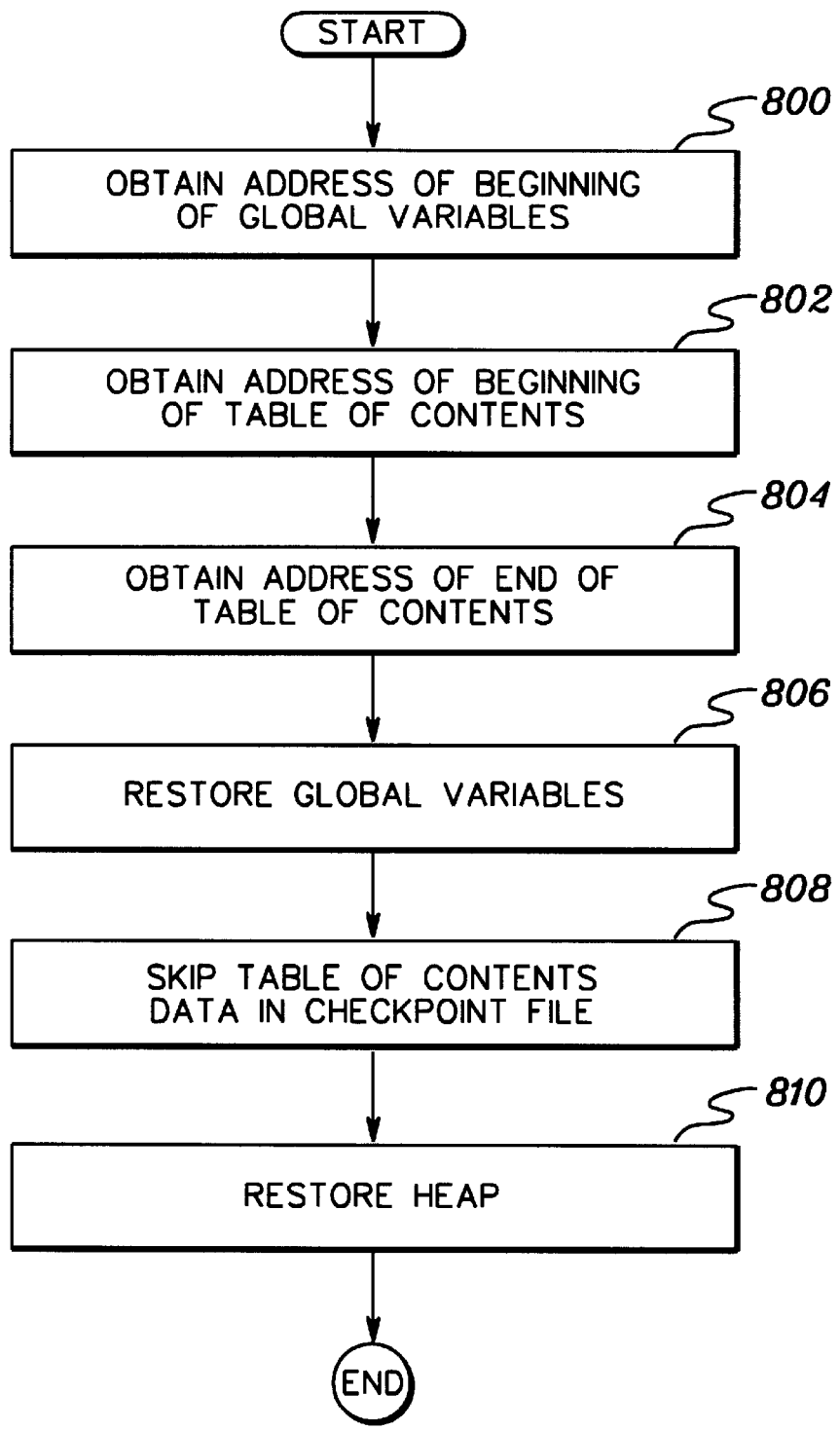
FIG. 8 depicts one embodiment of the logic associated with restoring a data section of the process, in accordance with the principles of the present invention.

One embodiment of restoring the Data Section is described with reference to FIG. 8. Initially, an address of the beginning of the global variables portion of the Data Section is obtained, STEP 800. For example, in AIX and similar UNIX-like operating systems, the address of the beginning of the Data Section is made available in the \_data variable, provided by the linker/binder.

Thereafter, the address of the beginning of the table of contents is obtained, STEP 802. This is available, for instance, in a register (e.g., general purpose register 2, in AIX). The value of this register is obtained either by writing a short assembler language function that returns this value, or, in AIX, by extracting the appropriate register from the jmp\_buf structure after a call to the setjmp ( ) function call.

The end of the table of contents, in AIX, extends until the end of the "initialized data" section. The end is obtained from the linker/binder defined global variable \_edata, provided by the loader, STEP 804. After obtaining these pieces of information, the location of the table of contents in the process' Data Section is known, as well as how far the table of contents extends.

Subsequently, the Data Section is restored up to the beginning of the table of contents. In particular, the global variables of the Data Section, which precede the table of contents, are restored by copying the global variables in the checkpoint file into memory, STEP 806. The extent of the global variables is defined by the beginning address of the global variables and the beginning address of the table of contents.

Restoration of the Data Section then continues by skipping over the data in the checkpoint file that contains the old table of contents, STEP 808. The table of contents data in the checkpoint file is skipped using, for example, lseek ( ) in AIX. (lseek ( ) and other AIX functions are described in "AIX Version 4.3 Technical Reference," Publication No. SBOF-1878, Volumes 1–6, (October 1997), which is hereby incorporated herein by reference in its entirety.)

Thereafter, the remainder of the data from after the table of contents until the end of the Data Section (whose value is given by sbrk (0), stored in the checkpoint file) is restored. That is, the heap is restored using the information in the checkpoint file, STEP 810.

Described in detail above is a restore capability that allows selected information, such as attributes associated with references to external functions/variables, to remain unrestored. The technique of the present invention is self-contained within the process, in that the restore is accomplished by the process.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of restoring checkpointed processes that have references to external data, said method comprising:

restarting a process on a computing unit from a checkpoint taken of said process, wherein said process includes a reference to an external datum; and restoring said process using information obtained from said checkpoint, wherein said restoring leaves one or more attributes of said external datum unrestored.

2. The method of claim 1, wherein said external datum comprises one of an external function and an external variable.

3. The method of claim 1, wherein said restarting comprises restarting said process on said computing unit, which is different than a computing unit used to take said checkpoint or the same as said computing unit used to take said checkpoint.

4. The method of claim 1, wherein said one or more attributes are located in a data section of said process, and wherein said restoring comprises restoring said data section except for said one or more attributes stored therein.

5. The method of claim 4, wherein said restoring of said data section comprises:

obtaining a beginning address of a table of contents of said data section, said table of contents including said one or more attributes;

obtaining an ending address of said table of contents;

restoring information located in said data section before said beginning address of said table of contents, if any; and restoring information located in said data section after said ending address of said table of contents, if any.

6. The method of claim 4, wherein said restoring of said data section comprises:

obtaining a beginning address of a global variables portion of said data section;

obtaining a beginning address of a table of contents of said data section, said table of contents including said one or more attributes;

obtaining an ending address of said table of contents;

restoring one or more global variables of said global variables portion, said global variables portion being defined by said beginning address of said global variables portion and said beginning address of said table of contents; and restoring a heap of said data section, a beginning of which is defined by said ending address of said table of contents.

7. A system of restoring checkpointed processes that have references to external data, said system comprising:

means for restarting a process on a computing unit from a checkpoint taken of said process, wherein said process includes a reference to an external datum; and means for restoring said process using information obtained from said checkpoint, wherein said means for restoring leaves one or more attributes of said external datum unrestored.

8. The system of claim 7, wherein said external datum comprises one of an external function and an external variable.

9. The system of claim 7, wherein said means for restarting comprises means for restarting said process on said computing unit, which is different than a computing unit used to take said checkpoint or the same as said computing unit used to take said checkpoint.

10. The system of claim 7, wherein said one or more attributes are located in a data section of said process, and wherein said means for restoring comprises means for restoring said data section except for said one or more attributes stored therein.

11. The system of claim 10, wherein said means for restoring said data section comprises:

means for obtaining a beginning address of a table of contents of said data section, said table of contents including said one or more attributes;

means for obtaining an ending address of said table of contents;

means for restoring information located in said data section before said beginning address of said table of contents, if any; and means for restoring information located in said data section after said ending address of said table of contents, if any.

12. The system of claim 10, wherein said means for restoring said data section comprises:

means for obtaining a beginning address of a global variables portion of said data section;

means for obtaining a beginning address of a table of contents of said data section, said table of contents including said one or more attributes;

means for obtaining an ending address of said table of contents;

means for restoring one or more global variables of said global variables portion, said global variables portion being defined by said beginning address of said global variables portion and said beginning address of said table of contents; and means for restoring a heap of said data section, a beginning of which is defined by said ending address of said table of contents.

13. A system of restoring checkpointed processes that have references to external data, said system comprising:

a computing unit adapted to restart a process from a checkpoint taken of said process, wherein said process includes a reference to an external datum; and said computing unit being further adapted to restore said process using information obtained from said checkpoint, wherein one or more attributes of said external datum are left unrestored.

14. An article of manufacture, comprising:

at least one computer usable medium having computer readable program code means embodied therein for causing the restoring of checkpointed processes that have references to external data, the computer readable program code means in said article of manufacture comprising:

computer readable program code means for causing a computer to restart a process on a computing unit from a checkpoint taken of said process, wherein said process includes a reference to an external datum; and computer readable program code means for causing a computer to restore said process using information obtained from said checkpoint, wherein said computer readable program code means for causing a computer to restore said process leaves one or more attributes of said external datum unrestored.

15. The article of manufacture of claim 14, wherein said external datum comprises one of an external function and an external variable.

16. The article of manufacture of claim 14, wherein said computer readable program code means for causing a computer to restart comprises computer readable program code means for causing a computer to restart said process on said computing unit, which is different than a computing unit used to take said checkpoint or the same as said computing unit used to take said checkpoint.

17. The article of manufacture of claim 14, wherein said one or more attributes are located in a data section of said process, and wherein said computer readable program code means for causing a computer to restore comprises computer readable program code means for causing a computer to restore said data section except for said one or more attributes stored therein.

18. The article of manufacture of claim 17, wherein said computer readable program code means for causing a computer to restore said data section comprises:

computer readable program code means for causing a computer to obtain a beginning address of a table of contents of said data section, said table of contents including said one or more attributes;

computer readable program code means for causing a computer to obtain an ending address of said table of contents;

computer readable program code means for causing a computer to restore information located in said data section before said beginning address of said table of contents, if any; and computer readable program code means for causing a computer to restore information located in said data section after said ending address of said table of contents, if any.

19. The article of manufacture claim 17, wherein said computer readable program code means for causing a computer to restore said data section comprises:

computer readable program code means for causing a computer to obtain a beginning address of a global variables portion of said data section;

computer readable program code means for causing a computer to obtain a beginning address of a table of contents of said data section, said table of contents including said one or more attributes;

computer readable program code means for causing a computer to obtain an ending address of said table of contents;

computer readable program code means for causing a computer to restore one or more global variables of said global variables portion, said global variables portion being defined by said beginning address of said global variables portion and said beginning address of said table of contents; and computer readable program code means for causing a computer to restore a heap of said data section, a beginning of which is defined by said ending address of said table of contents.

\* \* \* \* \*